May 29, 1945. A. B. HASLACHER 2,377,005
AUTOMATIC BOTTOM BAG AND METHOD OF MAKING SAME
Filed July 17, 1942 2 Sheets-Sheet 1
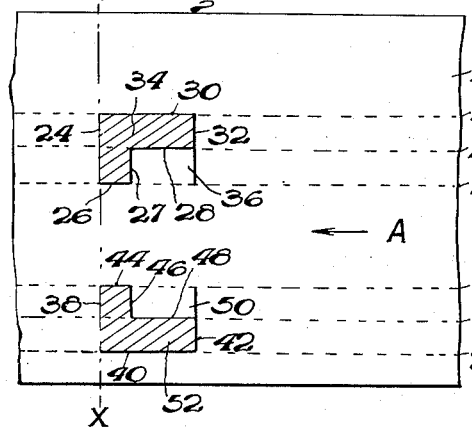
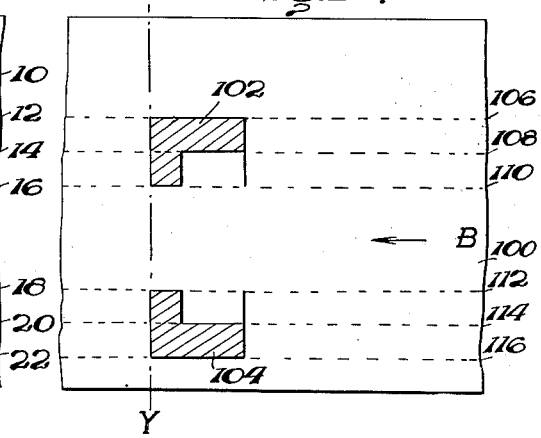
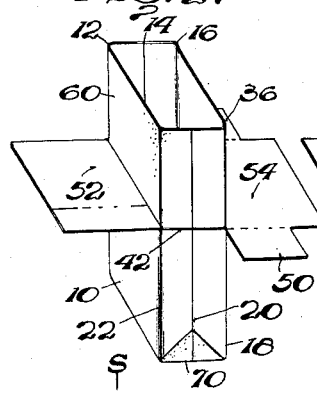
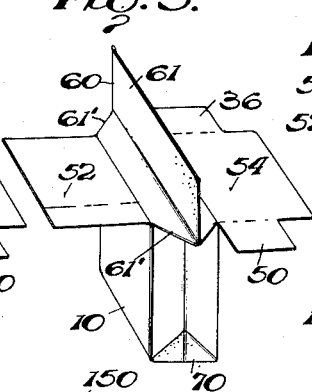
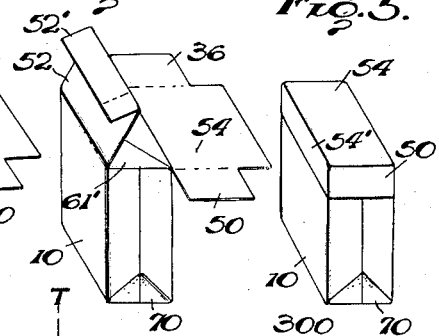
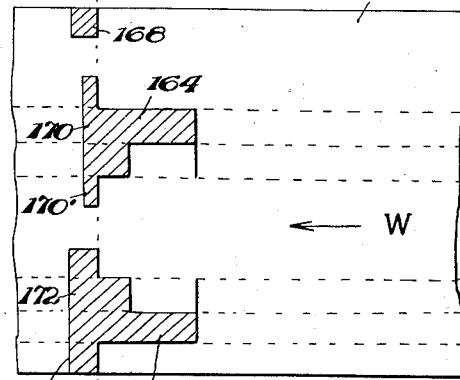
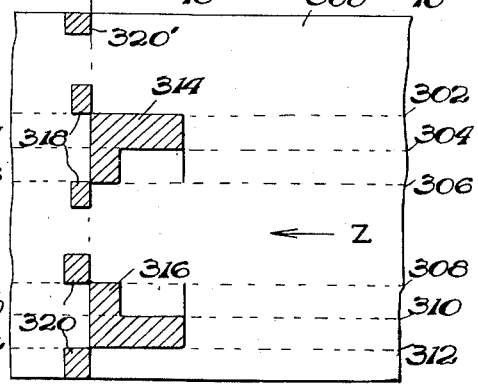
Inventor
Alfred B. Haslacher
By Ross C. Hurrey
Attorney May 29, 1945. A. B. HASLACHER 2,377,005
AUTOMATIC BOTTOM BAG AND METHOD OF MAKING SAME
Filed July 17, 1942 2 Sheets-Sheet 2
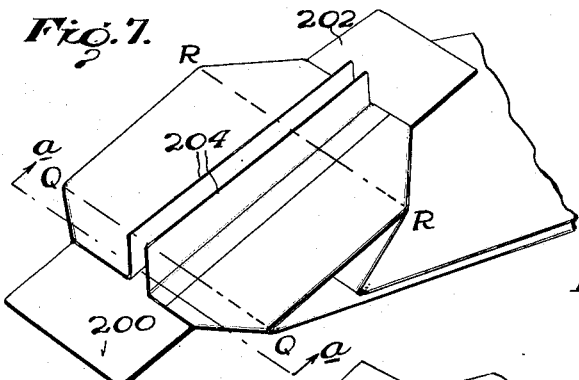
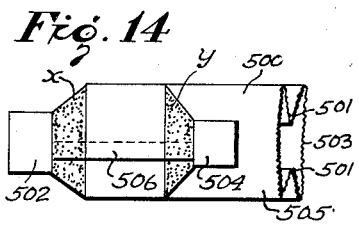
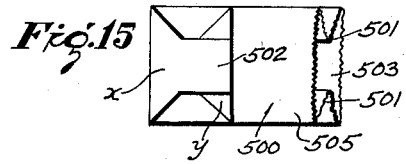
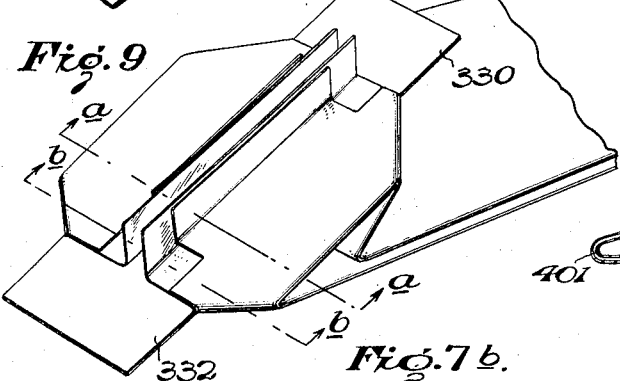
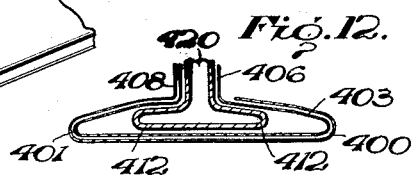
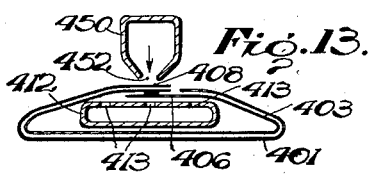
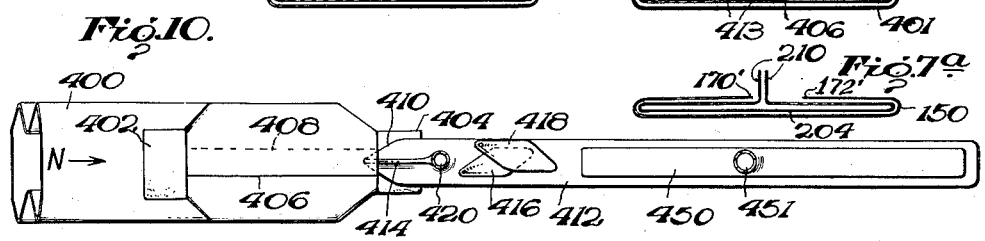
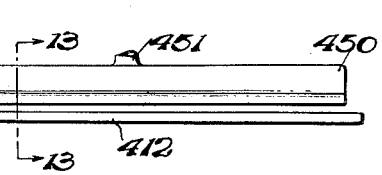
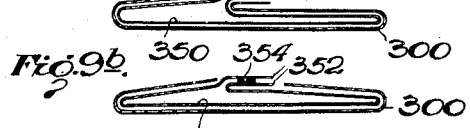
Inventor
Alfred B. Haslacher.
By Ross C. Hurrey
Attorney Patented May 29, 1945

2,377,005

UNITED STATES PATENT OFFICE 2,377,005

AUTOMATIC BOTTOM BAG AND METHOD OF MAKING SAME

Alfred B. Haslacher, New York, N. Y.

Application July 17, 1942, Serial No. 451,343

9 Claims. (Cl. 229—60)

It is an object of this invention to provide a mouth structure for a gusseted bag having an inner ply of heat-fusible material in which the the heat-fusible ply may be sealed in any desired manner and the outer ply may be formed into a closure attractive in appearance.

It is a further object of my invention to provide a bag having a mouth structure as above indicated but in which the bottom structure is not altered by the exigencies of the mouth structure.

It is a further object of my invention to improve the structure of the bag bottom disclosed in my co-pending application, Ser. No. 395,303, filed May 26, 1941, particularly for the purpose of facilitating heat sealing and to relate this improvement in the bottom structure to my improvement in the mouth structure so that either or both improvements may be incorporated in the tube preparatory to bottoming with a minimum of special steps.

It is a further object of this invention to provide a method of forming and bottoming bags having the improved features above mentioned.

These and other objects will be made clear from the following descriptions taken in connection with the annexed drawings in which:

Fig. 1 illustrates my treatment of the paper preparatory to formation of my improved bags;

Fig. 1A is identical with Fig. 1 except that it shows the treatment applied to a center-seam bag instead of a side-seam bag;

Fig. 2 is a perspective view showing my improved bag opened and filled with the parts in position for sealing of the heat-fusible ply;

Fig. 3 is a perspective view showing one method of arranging the heat-fusible ply for heat sealing;

Fig. 4 is a perspective view showing an intermediate step in completing the package;

Fig. 5 is a perspective view of the completed package;

Fig. 6 is a plan view of a web of paper showing the arrangement of slits and die cuts for the production of both my improved bottom and improved mouth structures.

Fig. 7 is a perspective view showing a two-ply tube, the outer ply of which is formed from the web shown in Fig. 6 and the tube having its bottom shown in the familiar diamond fold;

Fig. 7a is a cross section on the line a—a of Fig. 7;

Fig. 7b is a view similar to Fig. 7a showing the final disposition of the parts preparatory to the final sealing step;

Fig. 8 is a view similar to Fig. 6 and illustrating a modified form for the application of my improved bottom structure;

Fig. 9 is a perspective view similar to Fig. 7, illustrating a bag formed from the web of Fig. 8;

Fig. 9a is a section on the line A—A of Fig. 9 but with the parts in final sealing position;

Fig. 9b is a section similar to Fig. 9a but taken on the line B—B of Fig. 9.

Fig. 10 is a schematic plan view of the apparatus for carrying out my improved method.

Fig. 11 is an elevation corresponding to Fig. 10;

Fig. 12 is a section on the line 12—12 of Fig. 11;

Fig. 13 is a section on the line 13—13 of Fig. 11;

Fig. 14 is a plan view of a bag, formed in accordance with my application aforesaid, just prior to the final forming step; and Fig. 15 is a plan view of the completed bag bottom.

It is to be understood that any desired form of bottom may be applied to the bag disclosed herein. Preferably, however, a bottom should be of the type disclosed in my co-pending application, Ser. No. 395,303, filed May 26, 1941. That is, it should be of the pre-formed or "automatic" type hermetically closed in accordance with my aforesaid application.

Throughout this specification the word "paper" includes any and all flexible webs which do not have heat-fusible or thermoplastic characteristics, and the term "heat-fusible web or ply" includes not only sheets or webs formed of inherently heat-fusible or thermoplastic material but also sheets or webs surfaced with such material.

This invention is particularly concerned with the hermetic sealing of flexible walled bags. Generally speaking it is not difficult for the bag manufacturer to produce a perfect hermetic seal of the bottom of the bag. If, however, the function of the bag is that of a hermetically sealed package, the closure of the mouth, which is accomplished at the point of use, is of equal importance with the closure of the bottom. The difficulties of this problem are intensified by the fact that the user may have equipment varying from elaborate, fully automatic machinery to semiautomatic equipment amounting to little more than a hand tool. Accordingly, it is desirable that at the mouth of the bag the utmost latitude be given the user so that whatever his sealing equipment may be, he will have, nevertheless, an opportunity to make the type of closure best adapted to that equipment.

In Fig. 1, I show a web of paper 10 advancing in the direction of the arrow A. Lines 12, 14 and 16 indicate the ultimate location of one set of gusset folds, while lines 18, 20 and 22 represent the opposite set. These lines are located in Fig. 1 for the formation of a "side seam" bag in which the margin of the web 10 adjacent the line 22 will be folded over the opposite margin of the web 10 to form a seam.

As the web advances I form a transverse slit 24 extending between lines 12 and 16 and a second transverse slit 32 parallel to the slit 24 and extending between the same lines. I also form a transverse slit 27 somewhat to the rear of the slit 24 and extending between lines 14 and 16.

On the line 12 I form a longitudinal slit 30 connecting the outer extremities of the transverse slits 24 and 32. On the line 14 I form a longitudinal slit 28 connecting one extremity of the transverse slit 27 with the center of the rearward transverse slit 32, and on line 16 I form a longitudinal slit 26 connecting the inner extremities of the transverse slits 24 and 27.

The slits above described define the shaded area 34 which I remove from the web. This leaves a tongue or flap 36 defined by slits 27, 28 and 32.

Simultaneously with the above described steps I form a transverse slit 38 in alignment with the slit 24 and extending lines 18 and 22, and a transverse slit 42 in alignment with the transverse slit 32 and also extending between lines 18 and 22. I also form a transverse slit 46 in alignment with the slit 27 and extending between lines 18 and 20. I then form a longitudinal slit 40 on the line 22 and connecting the outer extremities of the transverse slits 38 and 42; a longitudinal slit 48 on the line 20 and connecting one extremity of the transverse slit 46 with the center of the transverse slit 42, and a longitudinal slit 44 on the line 18 connecting the inner extremities of the transverse slits 38 and 46.

While the relative locations of slits 27 and 28 in area 34 and of slits 46 and 48 in area 52 may be varied from those shown in Fig. 1, the slits 27 and 46 should always be spaced from slits 24 and 38, respectively, a distance equal to the spacing of slits 28 and 48 from lines 16 and 18, respectively, in order to form the sightly closure shown in Fig. 5.

The line X—X indicates the line at which the cut off of a bag length will take place and the areas 34 and 52 will be adjacent the mouth of the finished bag. The web 10 is superimposed upon a web of thermoplastic material, the superimposed webs are formed into a continuous gusseted tube and consecutive bag lengths are severed therefrom along the line X—X as above described.

In Fig. 1A I show a web of paper 100 advancing in the direction of the arrow B and have indicated by lines 106, 108 and 110 the fold lines of one set of gussets and by lines 112, 114 and 116 the location of the opposite sets. Areas 102 and 104 correspond with areas 34 and 52, respectively, of Fig. 1 and the line of cut off is indicated by the line Y—Y. Fig. 1A differs from Fig. 1 only in that the gusset fold lines are arranged to bring the longitudinal seam at the center of the back wall instead of at the side. Once the tube is formed, however, it is immaterial whether the bag be of the side seam or the center seam type.

Referring again to Fig. 1 it is to be noted that the distance between slits 27 and 32 is equal to the distance between the gusset lines 12 and 16 and the distance between slits 46 and 42 is equal to the distance between the gusset lines 18 and 22. Accordingly, the distance between transverse slits 24 and 32 and 38 and 42 substantially exceeds the width of the gusseted walls.

In Fig. 2 I show a bag having the paper web 10 as its outer ply and a heat-fusible web 60 as its inner ply. In this view the bag is standing on a preformed bottom 70 formed in accordance with my co-pending application aforesaid. The portion 52 of the rear wall of the paper ply lying between slits 32 and 42 (Fig. 1) and the mouth of the bag has been bent down into the horizontal plane and the equivalent portion 54 of the front wall has similarly been bent down to expose the entire mouth portion of the heat-fusible ply 60. Flaps 36 and 50, being attached to the front wall portion 54, have been drawn out from between the gusset folds and are similarly placed in the horizontal plane. It is to be understood that the essential feature is to clear the paper away from the heat-fusible ply. The portions 52 and 54 are shown in the horizontal plane for purposes of illustration, but can be bent to any position which will give satisfactory access to the mouth of the heat-fusible ply 60.

In Fig. 3 I illustrate one very satisfactory method for sealing the mouth of the heat-fusible ply. Here the exposed walls of the ply 60 have been drawn out into a common plane so as to form a fin 61 and this fin may be subjected to heat and pressure throughout its length to form a heat seal. This type of closure is particularly advantageous when the heat-fusible ply consists of coated material. It will be noted that this closure results in the formation of ears 61' at each end of the fin, said ears lying in the plane of the top of the bag's contents.

In Fig. 4 the fin 61 has been suitably folded into the plane of the bag's contents and the ears 61' have been folded over so as to lie within the cross section of the bag. The folded fin 61 is so placed as to lie to the left of Figs. 3 and 4. The portion 52 of the rear wall is then superimposed upon the collapsed and sealed inner ply 60, the extremity 52' of the portion 52 being doubled back upon itself. This has the effect of compensating the right-hand side of the bag for the folded up portions of the ply 60 so as to bring the top surface into as level and even a condition as possible.

In Fig. 5 I show the finished package in which the front wall portion 54 has been pulled across the top of the bag with its free edge 54' folded upon and suitably secured to the opposite vertical wall of the bag and the flaps 36 and 50 at the sides of the portion 54 have been folded upon and secured to their respective gusseted walls. This produces an extremely sightly closure since the top of the bag has a completely uninterrupted surface which may be suitably printed and has excellent stacking characteristics.

The closure of the heat-fusible ply 60 need not always be as shown in Fig. 3, though that type is probably best where the heat-fusible ply is a coated sheet. For certain heat-fusible materials it may be better to reform the gussets so as to collapse the mouth of the heat-fusible ply into a plane of the same width as the width of the package. In such case the flaps 36 and 50 should be withdrawn from the gussets, but the portions 52 and 54 of the rear and front walls may usefully be carried up over the collapsed mouth of the heat-fusible ply so as to protect the heat-fusible material during the imposition of heat and pressure. When the closure is thus formed the fin resulting from the heat sealing operation may be suitably folded upon itself and into the plane of the bag's contents, with the portions 52 and 54 thereafter being handled as illustrated in Figs. 4 and 5.

While I have described the treatment of the paper web preparatory to tubing as involving a particular sequence, this sequence is not critical and the slits may be formed in any sequence. Similarly, the slitting and die cutting operations may be carried out as part of a printing operation and the paper web then rewound before being superimposed on a heat-fusible web for the purpose of tubing.

In Fig. 6 I show a web of paper 150 advancing in the direction of the arrow W. Lines 152, 154 and 156 indicate one set of gusset fold lines, while 158, 160 and 162 indicate the opposite set. The transverse line S—S indicates the ultimate line of cut off of each tube length. Area 164 lying between lines 152, 156 and the cut off line S—S corresponds exactly to the area 34 illustrated in Fig. 1, while area 166, lying between lines 158, 162 and the cut off line S—S corresponds exactly to the area 52 of Fig. 1. To the left of the line S—S I provide die cut areas 168, 170 and 172. The areas 168 and 172 extend farther to the left of the cut off line S—S than does the area 170 and are preferably of twice the width of the area 170. The area 168 extends along the line S—S from the margin of the web 150 a distance equal to that between the line 162 and the opposite margin of the web 150 and when the tube is formed the area 168 will coincide with the lower end of the area 172 so as to lie within the longitudinal seam of the bag.

The lengths of the die cut areas 170 and 172 may be varied within certain limits. The tongues 200 and 202 forming the ends of the diamond fold are entirely conventional. They are formed in the flattened tube by pairs of slits in the front and rear walls, which permits opening of the diamond fold as shown in Figs. 7 and 9. This diamond fold structure is old and well known and is now almost universally used in bottoms of the preformed type. These tongues may be mutually of the same width and in the particular embodiment equality is probably preferable. There is, however, no reason why one tongue should not be made somewhat narrower than the other as shown, for example, in Fig. 14.

It is to be noted that in Fig. 6 areas 170 and 164 and the areas 172 and 166 are, in effect, merged and all of the material may be removed in a single operation. If, however, it is desired to dispense with the mouth closing features represented by the areas 164 and 166, these may be eliminated and all of the die cutting will take place to the left of the cut off line S—S. It is, moreover, possible in any event to eliminate either the area 170 or the areas 168 and 172 as will be hereinafter described. If, however, such elimination is to take place the die cut area which is used should be the relative depth indicated for areas 168 and 172.

As the web 150 advances constructive sets of die cut areas as above described are formed therein, each set being spaced from the next by the length of a tube to be severed therefrom. The web 150 is then superimposed upon a web of heat-fusible material and the superimposed webs are formed into a gusseted tube, each web having its own independent longitudinal seam. Consecutive lengths are then severed from the continuously formed tube and at the bottom end of each a diamond fold is opened by separating the flaps 200 and 202, the edges of the material intermediate these flaps being brought into upstanding face to face contact as disclosed in my co-pending application aforesaid. Due to the presence of the die cut areas 168, 170 and 172, the heat-fusible material 204 in the meeting portion of the edges is entirely exposed. This effect is clearly shown in Fig. 7a where the meeting edges 210 of the heat-fusible ply 204 form an upstanding seam which may be subjected to heat sealing without any danger of blocking the bottom of the bag. At one side of the edges 210 the edge 170' of the area 170 comes to the base of the fin. On the other side the edge 172' of the area 172 falls short of the base of the edges 210 by an amount equal to the height of the upstanding fin. The reason for this will be made clear from Fig. 7b in which the fin formed by the edge 210 has been folded into the plane of the bag bottom. At this time the bottom is subjected to transverse seals along the lines Q—Q and R—R, as described in my aforesaid co-pending application, of Fig. 7, but due to the gap between the edges 170' and 172' there is no differential of thickness to interfere with or prevent perfection of the heat seal. It will be noted in connection with Fig. 6 that the web 150 is completely severed by the various die cut areas except for those portions which will ultimately become the tongues 200 and 202. For certain grades of paper this is not objectionable. Where, however, certain grades of paper and certain tubing operations are used this is objectionable. Where a light grade of paper is to be used or where the web is to be subjected to considerable handling, as where the die cutting operation is performed as part of a preprinting operation and the web is re-wound before being tubed, the weakness occasioned by the presence of die cuts may be serious and to take care of such situations I have devised the alternative disclosed in Figs. 8, 9, 9a and 9b.

In Fig. 8 I show a web 300 advancing in the direction of the arrow Z. Lines 302, 304 and 306 indicate the location of one set of gusset folds, while lines 308, 310 and 312 indicate the opposite set. The transverse line T—T indicates the ultimate line of cut off. Area 314 lying behind lines 302 and 306 and the transverse line T—T corresponds exactly with area 34, Fig. 1, while die cut area 316 lying behind the lines 308, 312 and the transverse line T—T corresponds exactly with area 52 of Fig. 1. To the left of the line T—T I provide a pair of die cut areas 318 extending outwardly from lines 302 and 306, a pair of die cut areas 320 extending outwardly from lines 308 and 312, and a die cut area 320' extending inwardly from the upper margin of the web 300. When the web is tubed the area 320' will coincide with the marginal one of area 320 and will thus lie wholly within the longitudinal seam.

The portion of the web lying between the inner margin of the area 320' and the outer margin of the uppermost one of area 318 will in the final bag bottom define a tongue 330, while the material between the outer margin of the lowermost area 318 and the adjacent margin of the uppermost area 320 defines a tongue 332 forming the opposite end of the diamond fold, as shown in Fig. 9. For reasons which will be made clear hereinafter, the areas 320 and 320' should extend approximately twice as far to the left of the line T—T in Fig. 8 as do the areas 318.

The web, after removal of the several die cut areas, is superimposed upon a web of heat-fusible material and then superimposed webs are formed continuously into a gusseted tube, each web having its own independent longitudinal seam. Consecutive bag lengths are severed from the tube and are bottomed by first opening a diamond fold as indicated in Fig. 9. The edges of material between the flaps 330 and 332 are brought into face to face contact in a plane at right angles to the plane of the diamond fold, as described in my aforesaid copending application. Due to the presence of the die cut areas 318, 320 and 320', the paper does not cover the heat-fusible material at the extremities of the upstanding seam formed by the meeting edges. This fin while upstanding is heat sealed to avoid the possibility of blocking the bag bottom and is then folded into the plane of the bag bottom as illustrated in Figs. 9a and 9b. Fig. 9a is a section taken within that portion of the fin where the paper and the heat-fusible material are co-extensive. The heat-fusible ply 350 has its edges 352 fused along the line 354 to form a fin faced on each side by paper. After the formation of this fin transverse heat seals are to be applied as illustrated and described in connection with Fig. 7. Fig. 9b is taken along the line B—B of Fig. 9 and illustrates the condition of the parts in the area where the transverse seal is to be applied. Due to the presence of the die cut areas 318, 320 and 320', the material of the heat-fusible ply 350 in the region of its edges 352 is exposed and is not subjected to differences of thickness or heat transmissibility by the presence of the paper ply 300. Accordingly, a perfect transverse seal may be obtained.

It is optionally possible to eliminate either the die cut area 318 or the areas 320 and 320' but if one set is eliminated the remaining set should be of the depth indicated in Fig. 8 for areas 320 and 320' in order to avoid having paper underlie the edges 352 at the point of transverse sealing, as will be clear from Fig. 9b. If in Fig. 8, for example, the area 318 be eliminated, the right-hand edge of paper in Fig. 9b would cover the uppermost one of the edges 352 of the heat-fusible ply 350. This might be desirable where the nature of the material of the heat-fusible ply 350 is such as to make the shielding action of the paper desirable.

If the bag is made up of an outer ply of paper and an inner ply of paper coated on its inner surface with thermoplastic material, the form shown in Fig. 7b, without change, is preferred and obviously under such conditions the central seam cannot be made in the manner illustrated in Fig. 13.

In Figs. 10 to 13, inclusive, I illustrate an alternative treatment of the central seam of the diamond fold in a bag of this class. This treatment may be used in connection with a web die cut as illustrated in Fig. 6 and is applicable to the form of that figure even though only one effective die cut area, such as that comprising the areas 168 and 172, be provided.

In Fig. 10 I show a two-ply bag 400, the bottom of which has been die cut in accordance with Fig. 6, eliminating, however, the area 170. Flaps 402 and 404 at the bottom end have been opened into a diamond fold. The edges 406 and 408 of the material intermediate the flaps have, however, been brought into simple overlapping relationship instead of being brought into the upstanding condition illustrated in Figs. 7 and 9. The bag advances in the direction of the arrow N and encounters the leading end 410 of a member 412. At the leading end 410 of the member 412 there is a plowshare 414 which as the bag 400 advances lifts the edges 406 and 408 into upstanding condition. As these edges pass beyond the plowshare they encounter a pair of folding members 416 and 418. The folding member 416 lies in advance of the member 418 and brings the edge 406 back into the plane of the bag bottom, while the member 418 superimposes the edge 408 upon the edge 406, with the member 412 lying under the superimposed edges. It is to be noted in Fig. 12 that the bag 400 is composed of a paper ply 401 and a heat-fusible ply 403 and that as a result of the die-cut, the paper ply 401 terminates short of the edge 406 of the heat-fusible material. As a result, after the action of the folding members 416 and 418 the parts are in the relationship shown in Fig. 13, with the heat-fusible portion of the edge 408 superimposed on the exposed portion 406 of the heat-fusible material in the opposite edge. The member 412 is hollow and is supplied with cooling air by a duct 420. The air emerges from the member 412 through openings 413 in its upper surface. Additional openings may be provided in the sides and the lower surface, if desired. This is an optional feature necessary in connection with certain types of heat-fusible material and unnecessary in connection with certain other types. The cooling feature should be used whenever the heat-fusible ply has the characteristic of remaining soft and tacky for an appreciable time after having been subjected to a heat sealing operation. In such case the cooling medium moving through the member 412 acts not only to expedite the setting of the heat-fusible material but also in the nature of a lubricant to facilitate sliding of the material over the member 412.

Above the member 412 is mounted a duct 450 supplied with heated gas by a pipe 451. On the side of the duct 450 adjacent the member 412 there is a narrow orifice 452. When hot gas is supplied under pressure it emerges from the orifice 452 with considerable velocity. The heat content of the gas serves to heat the portion of the bag immediately thereunder and the velocity of the gas serves to press the parts together as described in my co-pending application, Ser. No. 438,161, filed April 8, 1942, and the duct 450 is of sufficient length to enable a satisfactory seal to be formed. As shown in Fig. 10, the cooling member 412 extends substantially beyond the trailing end of the heating member 450. This is to enable the cooling member to "set" the heat-fusible material before being withdrawn. Any possibility of blocking is thereby eliminated. Thereafter transverse heat seals may be formed across the ends of the diamond as hereinabove described. Due, however, to the exposure of the heat-fusible material 406 uniform thickness and heat transmissibility is afforded for the formation of these transverse seals.

While I prefer to utilize a blast of hot gas for sealing purposes, this is not an indispensable feature. For example, anti-friction support in the form of rollers could be used in the upper surface of member 412 and the heat and pressure could be applied by means of pressure bars, traveling chains or rollers. While the top closure illustrated in Figs. 1 to 5, inclusive, is applicable only to a gusseted bag, the bottom structures illustrated in Figs. 7 to 13, inclusive, are equally applicable to the "automatic" bottom of a gusseted bag or to the "satchel" bottom of a non-gusseted bag. In either case the bottom when the bag is set up is rectangular and this rectangular area is what I refer to as the "ultimate bottom."

Figs. 14 and 15 illustrate generally the bag disclosed in my application Serial No. 395,303, filed May 26, 1941. In Fig. 14 I show a tube 500 having tucked-in gussets 501. The tube has a diamond-fold bottom, of which one end is a tongue 502 formed from the front wall 503 of the tube 500, and the other end is a somewhat narrower tongue 504 formed from the rear wall 505 of the tube 500. The entire interior surface of the tube 500 is formed of thermoplastic material, and the diamond-fold bottom is so proportioned that the margins of the material of the tube 500 intermediate the tongues 502 and 504 may be brought into face to face contact, forming a fin 506 which is heat-sealed and folded, as shown in Fig. 14, into the plane of the diamond. This same effect is illustrated for the bags herein in Figs. 7b, 9a and 9b. Transverse heat seals are then applied across the shaded areas X and Y. The entire shaded area may be sealed, but the sealing should not transgress upon the rectangular ultimate bottom of the bag, and the seal may be limited in width (lengthwise of the bag) to the portions only of the areas X and Y, but must extend entirely across these trapezoidal areas. Following the sealing of areas X and Y, the tongue 504 and the trapezoidal area Y are folded upon the rectangular bottom of the bag and the tongue 502 and the trapezoidal area X are folded to overlie the folded tongue 504. Ordinary adhesive is applied to secure the tongues together. This is without effect upon the hermetic character of the bottom seal. Its sole effect is mechanical. The appearance of the bag bottom in Fig. 15 is identical with the appearance of every bag bottom disclosed in this application.

It is to be noted that the structure and the hermetic seal of the bottom would be unaltered if the gussets 501 were thrust outwardly so as to make the bag of the so-called satchel-bottom type, and, unless otherwise specifically set forth, the claims are to be taken as readable upon either a gusseted or non-gusseted tube having a bottom of any of the types herein disclosed.

Other modifications of the forms herein described will occur to those skilled in the art and I do not intend to be limited to the precise forms and proportions herein described but only as set forth in the sub-joined claims which are to be broadly construed.

What is claimed is:

1. A bag comprising a length of flattened tube; said bag having an outer ply of paper and an inner ply of heat-fusible material; said bag having a diamond fold bottom including flaps defined by pairs of slits in opposed walls; said diamond fold having a central heat-sealed seam and a transverse heat seal adjacent one side of the ultimate bag bottom, said paper ply being cut away at the intersection of said central seam with said transverse heat seal to avoid differential paper thicknesses in said transverse heat seal.

2. A bag comprising a length of flattened tube, said bag having an outer ply of paper and an inner ply of heat-fusible material; said bag having a diamond fold bottom, including flaps defined by pairs of slits in opposed walls; said diamond fold having a central heat-sealed seam and transverse heat seals adjacent both sides of the ultimate bag bottom, said paper ply being cut away at the intersection of said central seam with said transverse heat seals to avoid differential paper thicknesses in said transverse heat seals.

3. A bag comprising a length of flattened tube, said bag having an outer ply of paper and an inner ply of heat-fusible material; said bag having a diamond fold bottom including flaps defined by pairs of slits in opposed walls; said diamond fold having a central heat-sealed seam formed by face to face contact of the inner surfaces of opposed margins of the material intermediate said flaps, said seam, after sealing, being folded into the plane of the bag bottom; a transverse line of heat sealing intersecting said central seam and lying adjacent one side of the ultimate bag bottom, the paper ply being cut away at least adjacent said intersection to eliminate differential paper thickness in said transverse heat seal.

4. A diamond fold bottom for a bag formed of an outer ply of paper and an inner ply of heat-fusible material, said bottom having flaps at the ends of the diamond fold, said flaps being defined by pairs of slits in opposed walls, said diamond fold having a longitudinal heat-sealed seam between overlapping margins of the heat-fusible ply, at least one corresponding margin of the paper ply being shortened to avoid mutual overlap of the corresponding paper margins.

5. A diamond fold bottom for a bag formed of an outer ply of paper and an inner ply of heat-fusible material, said bottom having flaps at the ends of the diamond fold, said flaps being defined by pairs of slits in opposed walls, said diamond fold having a longitudinal heat-sealed seam between overlapping margins of the heat-fusible ply, the corresponding margins of the paper ply being shortened to avoid mutual overlap and a transverse heat seal intersecting said seam, lying adjacent one side of the ultimate bag bottom, and being free of differential paper thicknesses throughout its length.

6. A diamond fold bottom for a bag formed of an outer ply of paper and an inner ply of heat-fusible material, said bottom having flaps at the ends of the diamond fold, said flaps being defined by pairs of slits in opposed walls, said diamond fold having a longitudinal heat-sealed seam formed between overlapping margins of the heat-fusible ply, the corresponding margins of the paper ply being shortened to avoid mutual overlap and a pair of transverse heat seals intersecting said seam, lying adjacent each side of the ultimate bag bottom, and being free of differential paper thicknesses throughout their respective lengths.

7. A diamond fold bottom for a bag formed of an outer ply of paper and an inner ply of heat-fusible material, said bottom having flaps at the ends of the diamond fold, said flaps being defined by pairs of slits in opposed walls, the paper ply being shorter than the heat-fusible ply across at least one margin of the material intermediate said flaps, said bottom having a longitudinal heat-sealed seam joining opposed margins of the heat-fusible ply intermediate said flaps.

8. A diamond fold bottom for a bag formed of an outer ply of paper and an inner ply of heat-fusible material, said bottom having flaps at the ends of the diamond fold, said flaps being defined by pairs of slits in opposed walls, the paper ply being shorter than the heat-fusible ply across at least one margin of the material intermediate said flaps, said bottom having a longitudinal heat-sealed seam joining opposed margins of the heat-fusible ply intermediate said flaps and a transverse heat seal intersecting said seam, lying adjacent one side of the ultimate bag bottom and being free of differential paper thicknesses throughout its length.

9. A diamond fold bottom for a bag formed of an outer ply of paper and an inner ply of heat-fusible material, said bottom having flaps at the ends of the diamond fold, said flaps being defined by pairs of slits in opposed walls, the paper ply being shorter than the heat-fusible ply across at least one margin of the material intermediate said flaps, said bottom having a longitudinal heat-sealed seam joining opposed margins of the heat-fusible ply intermediate said flaps and a pair of transverse heat seals intersecting said seam, lying adjacent each side of the ultimate bag bottom and being free of differential paper thicknesses throughout their respective lengths.

ALFRED B. HASLACHER.